United States Patent [19]
Dixon

[11] Patent Number: 5,605,202
[45] Date of Patent: Feb. 25, 1997

[54] APPARATUS AND METHOD FOR ENHANCING PERFORMANCE OF AN OCCUPANT RESTRAINT SYSTEM IN A VEHICLE

[75] Inventor: Scott M. Dixon, Sterling Heights, Mich.

[73] Assignee: ITT Automotive, Inc., Auburn Hills, Mich.

[21] Appl. No.: 476,663

[22] Filed: Jun. 7, 1995

[51] Int. Cl.[6] .................... B60R 21/32; B60R 22/46
[52] U.S. Cl. ................ 180/268; 180/282; 280/735; 280/806
[58] Field of Search .................... 180/268, 271, 180/274, 282; 280/735, 734, 806, 807

[56] References Cited

U.S. PATENT DOCUMENTS

| | | | |
|---|---|---|---|
| 4,655,312 | 4/1987 | Frantom et al. | 180/268 |
| 4,666,097 | 5/1987 | Tsuge et al. | 180/268 |
| 4,861,117 | 8/1989 | Reinartz et al. | 303/113.3 |
| 4,869,559 | 9/1989 | Klein | 303/113.3 |
| 4,900,105 | 2/1990 | Burgdorf et al. | 303/116.1 |
| 4,919,495 | 4/1990 | Kircher et al. | 303/113.1 |
| 5,007,687 | 4/1991 | Kircher et al. | 303/113.1 |
| 5,201,385 | 4/1993 | Browne et al. | 180/268 |
| 5,372,411 | 12/1994 | Gerstenmaier et al. | 180/282 |
| 5,441,304 | 8/1995 | Zygutis et al. | 180/268 |

FOREIGN PATENT DOCUMENTS

| | | | |
|---|---|---|---|
| 52-49527 | 4/1977 | Japan | 180/268 |

*Primary Examiner*—Brian L. Johnson
*Assistant Examiner*—Peter C. English
*Attorney, Agent, or Firm*—Thomas N. Twomey; J. Gordon Lewis

[57] ABSTRACT

An apparatus enhances performance of an occupant restraint system of a vehicle. A signal is generated based on vehicle dynamics and selectively places at least one safety module in a heightened state of awareness in response to the signal. The vehicle dynamics can include at least one parameter based on wheel movement. The parameter based on wheel movement can be provided by an anti-lock brake control system and/or a traction control system, or the like. The safety module capable of being placed in a heightened state of awareness can include a three-point seatbelt, an airbag, a pyrotechnic buckle pretensioner and/or an electro-mechanical retractor pretensioner or the like.

20 Claims, 4 Drawing Sheets

APPARATUS AND METHOD FOR ENHANCING PERFORMANCE OF AN OCCUPANT RESTRAINT SYSTEM IN A VEHICLE

FIELD OF THE INVENTION

The present invention relates to an apparatus and method for enhancing the ability of a restraint system in a vehicle to protect the occupants, and more particularly allows the restraint system to react to vehicle data other than G-force or inertia based triggers.

BACKGROUND OF THE INVENTION

Prior known restraint systems operate in response to sensors once the G-force or inertia thresholds (approximately 0.7 g's for seatbelts) required to activate the restraint system have been exceeded. Typically, seatbelt sensors are mechanical devices that activate the retractor, or more specifically, place the retractor in a "locked" position (no further webbing is allowed to pay out of the retractor once it has been locked). During normal airbag and pyrotechnic pretensioner (buckle or retractor) operation, these devices are operated according to a control program stored in memory that constantly monitors the operation and readiness of the restraint system, typically including a diagnostic routine that continually checks for any error signals from the sensors or other components of the restraint system indicating a component failure requiring repair, or other maintenance or service. While on-board diagnostics are desirable, continuous operation of the diagnostic routine during the normal operation of the vehicle restraint system controller requires the dedication of at least a portion of the processing time of the central processing unit to be allocated to the diagnostic routine rather than continuously monitoring the status of the sensors in preparation for activation of the restraint system to protect the occupants of the vehicle.

SUMMARY OF THE INVENTION

It is desirable in the present invention to provide an apparatus and method for enhancing a restraint system for a vehicle to protect the occupants of the vehicle. The present invention provides an early warning to the restraint system of a potential crash, allowing the restraint system to prepare itself for optimal performance. The present invention allows the restraint system to react to other vehicle data in addition to the G-force or inertia based sensors. The other vehicle data is potentially available prior to reaching the G-force or inertia threshold required to activate the restraint system.

The occupant restraint system for a vehicle may include one or more of the following: a three-point seatbelt, one or more airbags, (driver and passenger; front and/or side) pyrotechnic pretensioner (buckle or retractor) and/or an electro-mechanical retractor pretensioner. The present invention is suitable for use with signals generated by anti-lock brake control systems, anti-lock brake and traction assist systems (sometimes referred to as traction control systems or traction slip control systems), automotive stability management systems, interactive vehicle dynamics systems, intelligent cruise control systems or accident avoidance systems (hereinafter all these systems are referred to generically as accident avoidance systems). These systems can communicate dynamic vehicle parameters, such as wheel movement parameters, including wheel slip, yaw rate or the like, to a restraint system controller which can control at least one safety device as described in greater detail below.

Where the safety device is three-point seatbelt, the restraint controller can command the retractor to remove excess or slack webbing from the system and put the retractor in a locked position. An electro-mechanical retractor pretensioner (electric motor attached to the retractor shaft with additional means to put the retractor in a locked position) can spool the excess webbing into the retractor. Currently, retractors will not lock up until approximately 0.7 g's of force lockup threshold is reached. The webbing pays out until lockup, adding to the slack webbing that previously existed in the system. If the safety device is a pyrotechnic buckle or retractor pretensioner, or an airbag, or any combination thereof, the restraint controller according to the present invention can force the device to a heightened state of alert in the control software, once the restraint controller receives data from an anti-lock brake system, anti-lock brake system/traction control system, or interactive vehicle dynamic controller corresponding to certain predetermined criteria. In addition to generating a signal based on vehicle dynamics, such as at least one parameter of wheel movement (for example, wheel slip and yaw rate), the present invention could operate on other input data, such as brake lamp switch data or the like.

An apparatus according to the present invention enhances performance of a occupant restraint system for a vehicle by providing means for generating a signal based on vehicle dynamics and by providing safety means for selectively placing at least one safety device in a heightened state of awareness, such as optimized position or optimized subroutine, in response to the signal. The present invention also encompasses a method for enhancing performance of an occupant restraint system for a vehicle comprising the steps of generating a signal with control means based on vehicle dynamics and in response to the signal, selectively placing at least one safety device in a heightened state of awareness with safety means.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
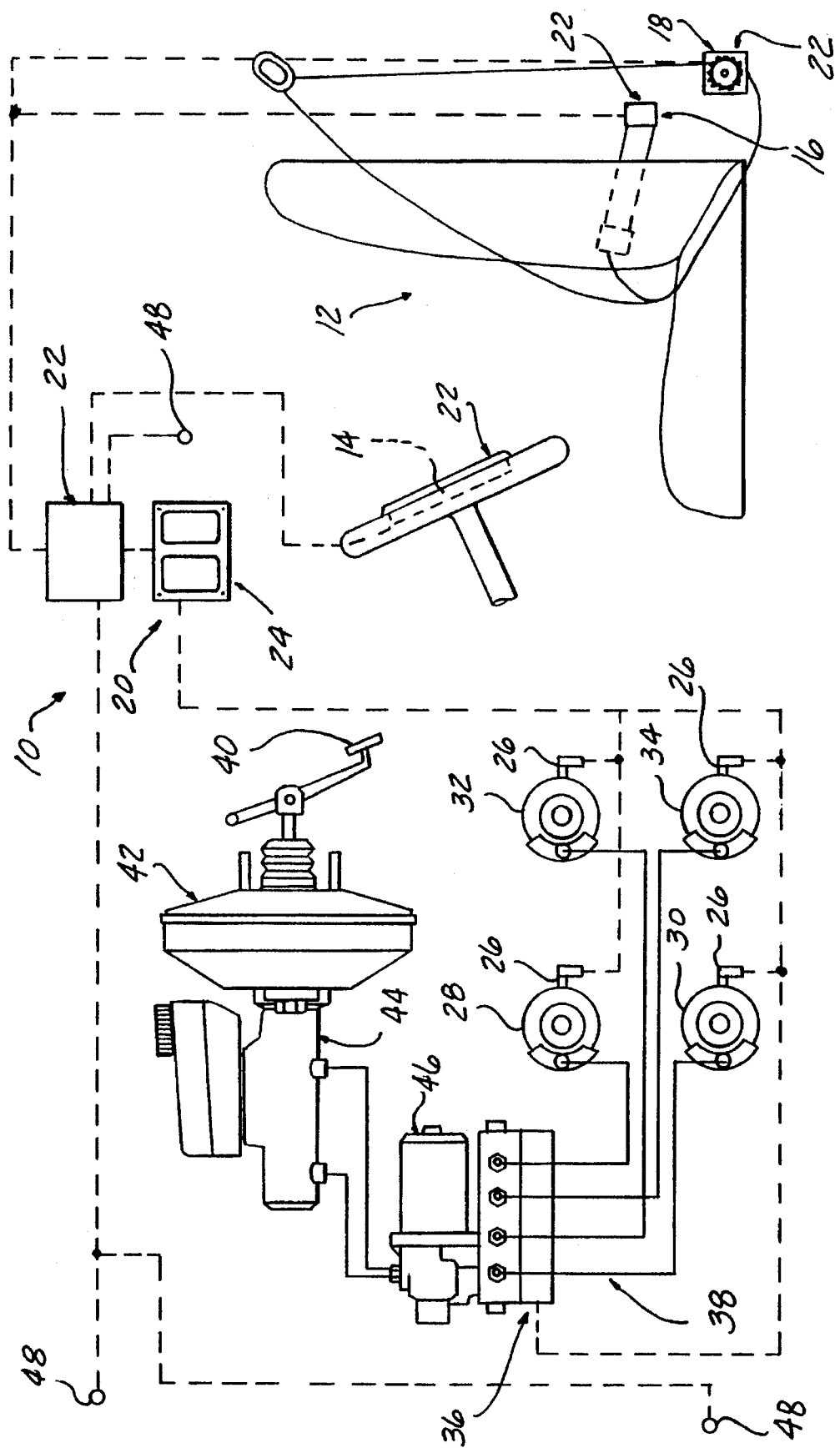
FIG. 1 is a schematic view of an apparatus for enhancing performance of an occupant restraint system for a vehicle according to the present invention.

An apparatus 10 according to the present invention enhances performance of an occupant restraint system 12 of a vehicle. The occupant restraint system 12 can include one or more of the following safety modules: an airbag 14, such as that stored in the central portion of a steering wheel, or in the dash in front of the passenger seat (commonly referred to collectively as the front airbags) and/or a side airbag; a pyrotechnic buckle or retractor 16; and an electro-mechanical retractor 18 capable of stowing excess webbing and engaging a pawl to a ratchet. The electro-mechanical retractor 18 can also have a pyrotechnic retractor pretensioner in addition to electro-mechanical portion, since some crashes could occur without unusual vehicle dynamics, such as slip or yaw, for example a head on collision without the brakes being applied. The apparatus 10 includes means 20 for generating a signal based on vehicle dynamics and safety means 22 for selectively placing at least one safety module of the occupant restraint system 12 in a heightened state of awareness in response to the signal.

The signal generating means 20 can include an anti-lock brake system (ABS), an anti-lock brake system and traction control system (ABS/TCS), or an automotive stability management system (ASMS), or other interactive vehicle dynamics system (IVD). Anti-lock brake systems and/or traction control systems are generally known to those skilled in the art. For example, further details regarding anti-lock brake control systems and/or traction control systems can be obtained from U.S. Pat. No. 4,869,559 issued Sep. 26, 1989; U.S. Pat. No. 4,861,117 issued Aug. 29, 1989; U.S. Pat. No. 4,919,495 issued Apr. 24, 1990; U.S. Pat. No. 5,007,687 issued Apr. 16, 1991 and U.S. Pat. No. 4,900,105 issued Feb. 13, 1990 all of which are incorporated herein by reference. Generally, anti-lock brake control systems and/or traction control systems include control means 24 for controlling wheel movement independently of one another. The control means 24 includes wheel sensors 26 and electronic circuits for determining the wheel rotating pattern of the front right wheel 28, front left wheel 30, rear right wheel 32 and rear left wheel 34 and for generating electrical brake pressure control signals capable of controlling pressure fluid inlet and outlet valves 36 disposed in a conduit system 38 for wheel movement control. The brake system is actuated by the vehicle operator pressing down on the brake pedal 40, which typically is connected to a standard vacuum booster 42 and a tandem master cylinder 44 as is conventional. The tandem master cylinder 44 operably controls the hydraulic control unit 46 as is also conventional.

Traditionally, safety modules forming part of an occupant restraint system 12, such as airbags 14, pyrotechnic buckle retractors or the like have been activated in response to crash sensors 48, such as accelerometers, G-force sensors, inertia sensors or the like. Typically, the occupant restraint system 12 included monitoring and diagnostic functions to test crash sensors 48 on a regular interval while the vehicle was being operated to determine if any sensor required maintenance or service, in addition to monitoring and actuating the trigger mechanism to actuate the safety module of the occupant restraint system 12. This dual function requires time on the part of the occupant restraint system 12 to perform the diagnostic subroutine, typically on a prescheduled periodic basis, and increases the cycle time between checks of the crash sensors 48 to determine if the occupant restraint system 12 should deploy or activate one or more of the safety modules.

The apparatus 10 according to the present invention provides a signal generating means 20 for generating a signal based on vehicle dynamics and safety means 22 for selectively placing at least one safety module in a heightened state of awareness in response to the signal. The vehicle dynamics can include at least one parameter based on wheel movement. The one parameter based on wheel movement can be provided by either an anti-lock brake control system (ABS), or a traction control system (ABS/TCS), or an automotive stability management system (ASMS), or intelligent cruise control system, or accident avoidance system, or interactive vehicle dynamics (IVD) system. In any case, control means 24 is provided for controlling wheel movement and can provide at least one parameter based on wheel movement corresponding to vehicle dynamics for generating a signal based thereon. The control means 24 (either ABS, ABS/TCS, ASMS or IVD) informs the safety means 22 that one or more wheels are in a slip condition, and/or can inform the safety means 22 with respect to a vehicle stability parameter, such as wheel slip, yaw rate, or the like.

Figure 4:
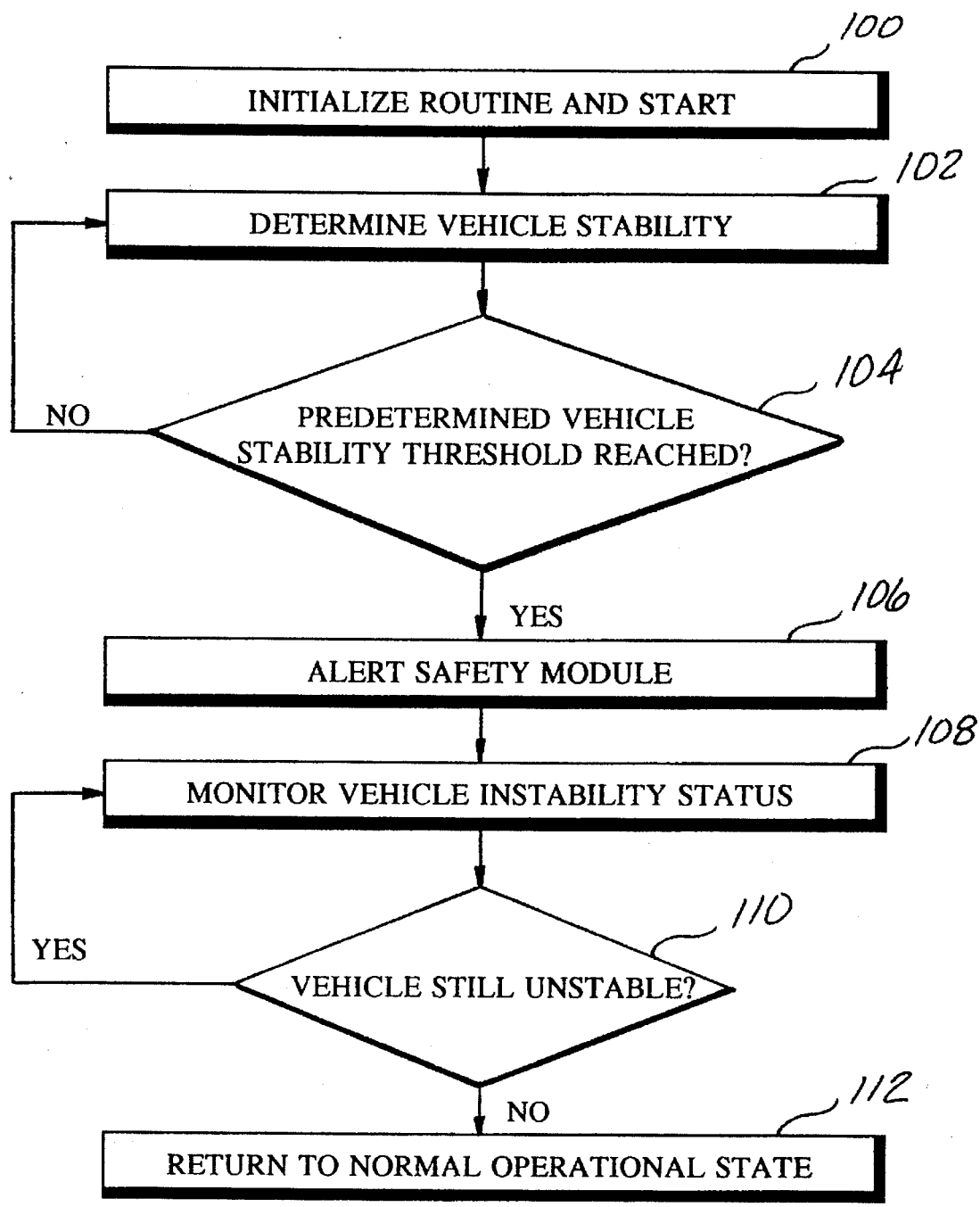
FIG. 4 is a simplified flow diagram of a control program according to the present invention for enhancing performance of an occupant restraint system of a vehicle.
Figure 5:
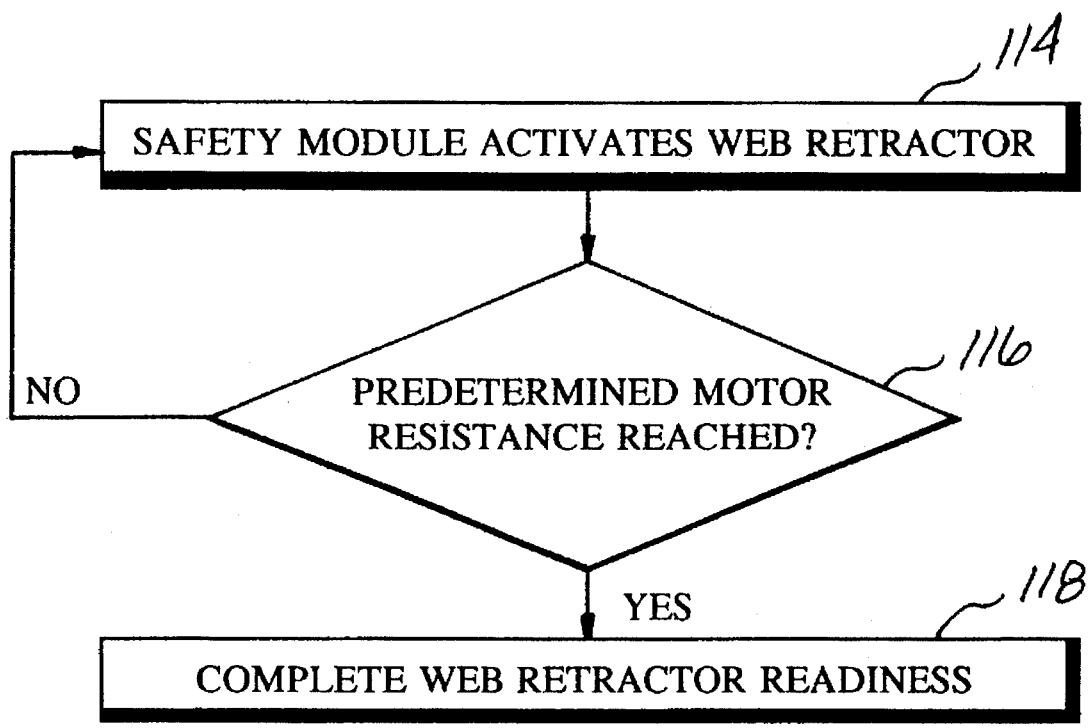
FIG. 5 is a simplified flow diagram of a portion of the control program stored in memory according to the present invention for activating a safety modular or device, such as a web retractor.

The present invention also encompasses a method for enhancing performance of an occupant restraint system 12 of a vehicle as illustrated in the simplified flow charts of FIGS. 4 and 5. The safety means 22 can include a control program stored in memory for operating the method including the steps of generating a signal with the control means 24 based on vehicle dynamics, and in response to the signal, selectively placing at least one safety module in a heightened state of awareness with safety means 22. The control program stored in memory can include the steps as indicated in FIG. 4 including initializing the routine and starting the control program as indicated in step 100. In step 102, a determination of vehicle stability parameters is conducted. The monitored vehicle stability parameter is then compared with a predetermined vehicle stability threshold in step 104. Based on the comparison, if the monitored vehicle stability parameter is less than the predetermined threshold, the program returns to step 102 to again determine the vehicle stability parameter. Based on the comparison, if the monitored vehicle stability parameter is greater than or equal to the predetermined vehicle stability threshold, the program continues on to step 106 to alert one or more safety modules. When in the alert mode, the program monitors the vehicle instability status in step 108 and compares the monitored vehicle stability parameter to the predetermined threshold to determine if the vehicle is still unstable in step 110. Based on the comparison of step 110, if the vehicle is still unstable, the program returns to step 108 to further monitor the vehicle instability status. If the comparison of step 110 determines that the vehicle is no longer unstable, the control program continues to step 112 where the program is returned to a normal operating state and returns to step 102 to again determine the vehicle stability.

The alert safety module step 106 can be accomplished via a message on a bus or through a hard wired signal. When the safety module is alerted in step 106, the safety module enters a heightened state of alert. In this heightened state of alert, the safety module uses the most efficient subroutines for actuation of the safety module, such as an airbag, pyrotechnic buckle, pyrotechnic retractor, or electro-mechanical retractor. This may mean temporarily disabling safety module diagnostics, operational parameter identification (PID), or the like during the event, thereby decreasing controller loop time and improving the ability of the controller to react in a shorter time period. Step 108 monitor the vehicle instability status and can be performed via a message on a bus or a hard wired signal from the anti-lock brake system, anti-lock brake system and traction control system, or automotive stability management system (ASMS) module.

Figure 2:
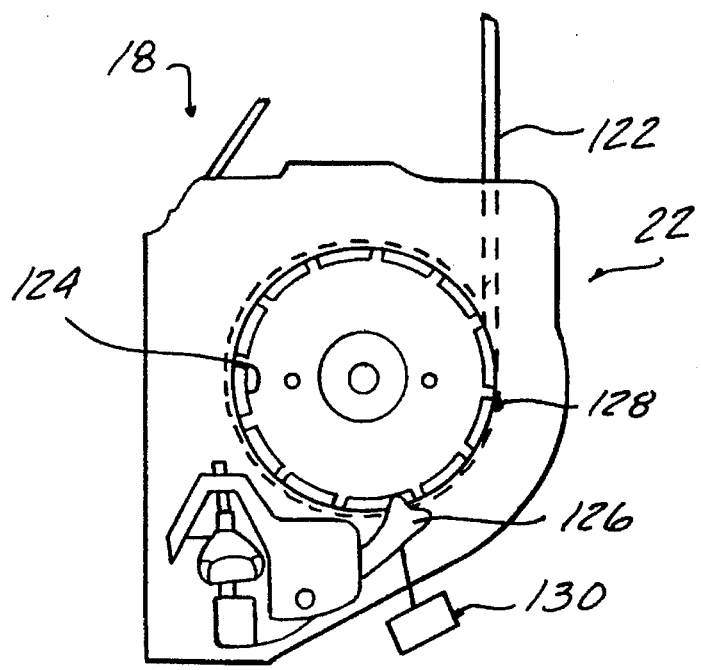
FIG. 2 is a side view of an electro-mechanical retractor pretensioner means according to the present invention.
Figure 3:
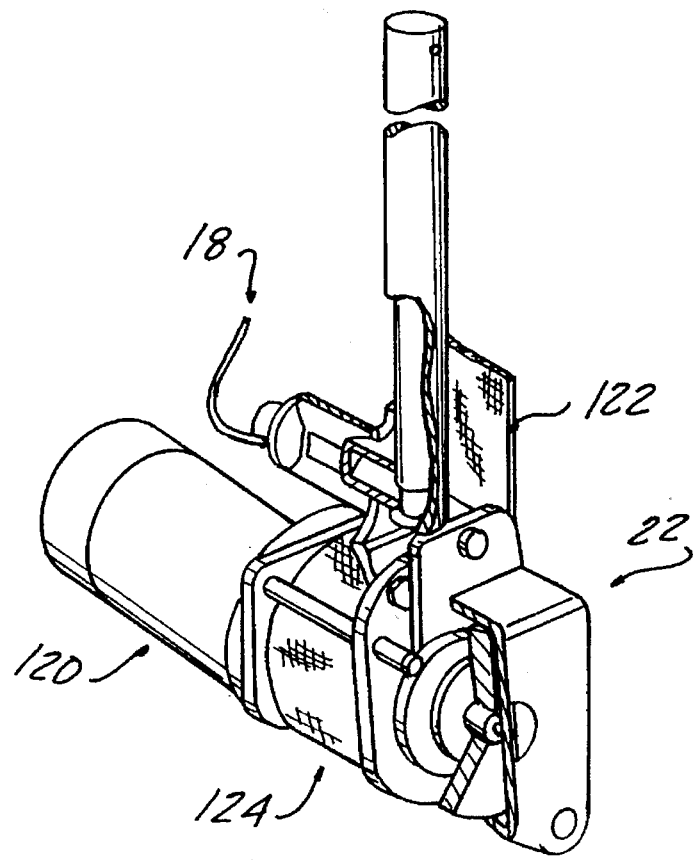
FIG. 3 is a perspective view of a pyrotechnic retractor pretensioner means shown in FIG. 2 according to the present invention with certain portions broken away for clarity.

For purposes of illustrating the present invention, a simplified flow diagram for the actuation of a safety module corresponding to an electro-mechanical web retractor is illustrated in FIG. 5. When the safety module is alerted pursuant to the alerting step 106 of FIG. 4, the safety module activates the web retractor in step 114. As seen in FIGS. 2 and 3, the electro-mechanical web retractor includes a motor 120 for stowing webbing 122 on spool 124. The motor 120 turns a shaft connected to the retractor spool 124 in order to stow the excess or slack portion of webbing 122 on the spool prior to any collision. The program compares the motor resistance in step 116 with a predetermined motor resistance value. If the motor resistance has not reached the predetermined resistance value, the program returns to step 114 to continue activation of the web retractor. If the motor resistance has exceeded the predetermined motor resistance value, the program continues to step 118 to complete the web retractor readiness. Completing the web retractor readiness could include steps, such as turning off the motor 120 to stop stowing webbing 122 on the spool 124 of the retractor, placing the pawl 126 in an engaged position with respect to a ratchet 128 connected to the spool 124 to prevent deployment of webbing 122 from spool 124. Typically, an occupant restraint system safety module, such as seatbelts formed of webbing 122, are set for a G-force threshold of approximately 0.7 G's. The apparatus and method according to the present invention can enable pretensioning of the seatbelt webbing 122 and positive locking of the ratchet and pawl mechanism, such as by actuator 130 for driving the pawl 126 into locking engagement with the ratchet 128 prior to a collision. The actuator 130 can include any electrically actuated motor, such as a solenoid for driving the pawl 126 into the ratchet 128, in addition to the normal inertia or acceleration actuation operation of the pawl 126 and ratchet 128 assembly. When returning to a normal operational state pursuant to step 112, the pawl 126 would be disengaged from the ratchet 128 in order to allow webbing 122 to be removed from spool 124.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In an occupant restraint system for a vehicle having at least one sensor for sensing a state of at least one accident avoidance system, and control means for periodically performing a diagnostic subroutine function with respect to at least one crash sensor, the improvement comprising:

means for generating a signal based on vehicle dynamics corresponding to said sensed state by said at least one accident avoidance system sensor; and safety means for selectively placing at least one safety module in a heightened state of awareness in response to said signal, wherein said heightened state of awareness includes temporarily suspending periodic performance of said diagnostic subroutine function by said control means.

2. The apparatus of claim 1 further comprising:

said vehicle dynamics including at least one parameter of wheel movement.

3. The apparatus of claim 2 further comprising said at least one parameter of wheel movement provided by at least one system selected from the group consisting of an anti-lock brake control system and a traction control system.

4. The apparatus of claim 1 further comprising:

wheel control means for controlling wheel movement independent of one another, said wheel control means including said signal generating means based on vehicle dynamics.

5. The apparatus of claim 1 further comprising:

said at least one safety module selected from the group consisting of a three-point seat belt, an air bag, a pyrotechnic buckle pretensioner and a retractor pretensioner.

6. In an occupant restraint system for a vehicle having at least one sensor for sensing a state of at least one accident avoidance system, and control means for periodically performing a diagnostic subroutine function with respect to at least one crash sensor, the improvement comprising:

means for generating a signal based on vehicle dynamics including at least one parameter of wheel movement corresponding to said sensed state by said at least one accident avoidance system sensor; and safety means for selectively placing at least one safety module in a heightened state of awareness in response to said signal based on at least one parameter of wheel movement, wherein said heightened state of awareness includes temporarily suspending periodic performance of said diagnostic subroutine function by said control means.

7. The apparatus of claim 6 further comprising:

said signal generating means including an anti-lock brake control system.

8. The apparatus of claim 6 further comprising:

said signal generating means including a traction control system.

9. The apparatus of claim 6 further comprising:

wheel control means for controlling wheel movement independently of one another, said wheel control means including said signal generating means based on vehicle dynamics.

10. The apparatus of claim 6 further comprising:

said at least one safety module selected from the group consisting of a three-point seat belt, an air bag, a pyrotechnic buckle pretensioner and a retractor pretensioner.

11. In a method for enhancing performance of an occupant restraint system for a vehicle having at least one sensor for sensing a state of at least one accident avoidance system, and control means for periodically performing a diagnostic subroutine function with respect to at least one crash sensor, the improvement comprising the steps of:

generating a signal based on vehicle dynamics corresponding to said sensed state by said at least one accident avoidance system sensor; and in response to said signal, selectively placing at least one safety module in a heightened state of awareness with safety means, wherein said heightened state of awareness includes temporarily suspending periodic performance of said diagnostic subroutine function by said control means.

12. The method of claim 11 wherein said signal generating step further comprises:

said vehicle dynamics including at least one parameter of wheel movement.

13. The method of claim 11 wherein said signal generating step further comprises:

said at least one accident avoidance system including at least one system selected from the group consisting of an anti-lock brake control system and a traction control system.

14. The method of claim 11 further comprising the step of:

controlling wheel movement with wheel control means to provide at least one system selected from the group consisting of an anti-lock brake control system and a traction control system.

15. The method of claim 14 further comprising the steps of:

determining vehicle stability based on said vehicle dynamics;

comparing vehicle stability with a predetermined vehicle stability threshold;

if said vehicle stability is within said predetermined threshold, returning to the determining step;

if said vehicle stability is beyond said predetermined threshold, performing said generating step to generate said signal to alert said at least one safety module.

16. The method of claim 15 further comprising the steps of:

if said vehicle stability is beyond said predetermined threshold, monitoring vehicle stability status;

comparing vehicle stability status to said predetermined vehicle stability threshold;

if said vehicle stability status is beyond said predetermined threshold, returning to the monitoring step; and if said vehicle stability status is within said predetermined threshold, initializing to a normal operational state, wherein said heightened state of awareness is terminated and the periodic performance of said diagnostic subroutine function is restored, and returning to the determining step.

17. The method of claim 16 further comprising the steps of:

in response to said signal, activating a web retractor safety module;

monitoring motor resistance of the retractor;

comparing said monitored motor resistance to a predetermined motor resistance;

based on said comparing step, if said predetermined motor resistance is greater than said monitored motor resistance, continuing to activate said web retractor safety module; and based on said comparing step, if said monitored motor resistance is at least as great as said predetermined motor resistance, completing web retractor safety module readiness and discontinuing activation of said web retractor safety module.

18. In an occupant restraint system for a vehicle having at least one sensor for sensing a state of at least one accident avoidance system and control means for periodically performing a diagnostic subroutine function with respect to at least one crash sensor, the improvement comprising:

signal means for generating a signal corresponding to a sensed state of said at least one sensor of said at least one accident avoidance system; and means responsive to said signal for temporarily suspending said diagnostic subroutine function of said control means for providing an increased rate of monitoring of said at least one sensor, for enhancing performance of said occupant restraint system, and for defining a heightened state of awareness of said occupant restraint system.

19. The improvement of claim 18 wherein:

said at least one accident avoidance system including at least one system selected from the group consisting of an anti-lock brake control system and a traction control system.

20. The improvement of claim 18 said occupant restraint system further comprising:

at least one safety module selected from the group consisting of a three-point seat belt, an air bag, a pyrotechnic buckle pretensioner and a retractor pretensioner.

\* \* \* \* \*